US008011902B2

(12) United States Patent
Nagase et al.

(10) Patent No.: US 8,011,902 B2
(45) Date of Patent: Sep. 6, 2011

(54) DRIVE CONTROL DEVICE OF FUEL PUMP

(75) Inventors: Kenichi Nagase, Nagoya (JP); Kenji Nagasaki, Nagoya (JP)

(73) Assignee: Denso Corporation, Kariya (JP)

( * ) Notice: Subject to any disclaimer, the term of this patent is extended or adjusted under 35 U.S.C. 154(b) by 1215 days.

(21) Appl. No.: 11/715,397

(22) Filed: Mar. 8, 2007

(65) Prior Publication Data

US 2007/0286747 A1 Dec. 13, 2007

(30) Foreign Application Priority Data

Mar. 28, 2006 (JP) ................................ 2006-086807

(51) Int. Cl.
*F04B 17/00* (2006.01)
*H02P 3/18* (2006.01)

(52) U.S. Cl. .................................... 417/410.1; 318/244

(58) Field of Classification Search ............... 417/423.7, 417/423.1, 44.11, 45; 123/497; 310/68 C; 318/244, 541; 340/648, 635
See application file for complete search history.

(56) References Cited

U.S. PATENT DOCUMENTS

| | | | | | |
|---|---|---|---|---|---|
| 4,403,177 | A | * | 9/1983 | Weber et al. | 318/400.11 |
| 4,726,746 | A | * | 2/1988 | Takada et al. | 417/423.1 |
| 4,827,897 | A | * | 5/1989 | Yamada et al. | 123/497 |
| 4,955,790 | A | * | 9/1990 | Nakanishi et al. | 417/45 |
| 5,197,865 | A | * | 3/1993 | Sevrain et al. | 417/420 |
| 5,295,737 | A | * | 3/1994 | Epple et al. | 303/11 |
| 5,313,923 | A | * | 5/1994 | Takeuchi et al. | 123/497 |
| 5,723,932 | A | * | 3/1998 | Ito et al. | 310/248 |
| 5,811,948 | A | * | 9/1998 | Sato et al. | 318/434 |
| 6,008,555 | A | * | 12/1999 | Garr et al. | 310/68 C |
| 6,042,349 | A | * | 3/2000 | Ito et al. | 417/423.7 |
| 6,109,893 | A | * | 8/2000 | Gliniecki et al. | 417/423.7 |
| 6,422,839 | B1 | * | 7/2002 | Brockner et al. | 417/423.7 |
| 6,559,611 | B1 | * | 5/2003 | Satake et al. | 318/145 |
| 6,652,249 | B2 | * | 11/2003 | Kenney et al. | 417/410.3 |
| 6,938,599 | B2 | | 9/2005 | Senda et al. | |
| 7,077,092 | B2 | | 7/2006 | Senda et al. | |
| 7,210,464 | B2 | | 5/2007 | Ukai et al | |
| 7,516,730 | B2 | | 4/2009 | Ukai et al. | |
| 2002/0008430 | A1 | * | 1/2002 | Tanaka et al. | 310/68 C |
| 2002/0085930 | A1 | * | 7/2002 | Hiraiwa et al. | 417/307 |
| 2004/0168664 | A1 | | 9/2004 | Senda et al. | |

(Continued)

FOREIGN PATENT DOCUMENTS

JP 60-37313 8/1985

(Continued)

OTHER PUBLICATIONS

Japanese Office Action dated May 21, 2009, issued in corresponding Japanese Application No. 2006-086807, with English translation.

*Primary Examiner* — Charles Freay
*Assistant Examiner* — Alexander Comley
(74) *Attorney, Agent, or Firm* — Nixon & Vanderhye P.C.

(57) ABSTRACT

A drive control device of a fuel pump for sucking fuel in a fuel tank supplying the fuel to an internal combustion engine, and using a motor with a brush as a drive source thereof. The drive control device includes a starting current reduction control device that starts the fuel pump in a state where a drive current of the fuel pump is reduced.

12 Claims, 12 Drawing Sheets

U.S. PATENT DOCUMENTS

| | | | | |
|---|---|---|---|---|
| 2005/0053470 | A1* | 3/2005 | Yamazaki et al. | 417/44.11 |
| 2005/0116693 | A1* | 6/2005 | Jang et al. | 323/222 |
| 2005/0150482 | A1 | 7/2005 | Ukai et al. | |
| 2005/0214127 | A1* | 9/2005 | Scanderbeg et al. | 417/12 |
| 2005/0253393 | A1 | 11/2005 | Senda et al. | |
| 2006/0024176 | A1* | 2/2006 | Ikeya | 417/366 |
| 2006/0275135 | A1* | 12/2006 | Nation et al. | 417/12 |
| 2007/0186909 | A1 | 8/2007 | Ukai et al. | |

FOREIGN PATENT DOCUMENTS

| | | |
|---|---|---|
| JP | 61-1621 | 1/1986 |
| JP | 62-127678 | 6/1987 |
| JP | 3-179158 | 8/1991 |
| JP | 2001-140765 | 5/2001 |
| JP | 2005-337167 | 12/2005 |

* cited by examiner

DRIVE CONTROL DEVICE OF FUEL PUMP

CROSS REFERENCE TO RELATED APPLICATION

The following is based on and claims priority to Japanese Patent Application No. 2006-86807, filed Mar. 28, 2006, which is hereby incorporated by reference in its entirety.

FIELD

The following relates to a drive control device of a fuel pump that sucks fuel in a fuel tank, supplies the fuel to an internal combustion engine, and uses a motor provided with a brush as a drive source thereof.

BACKGROUND

A fuel pump mounted in an automobile preferably has a relatively long operating life, a reduced size, and a reduced cost. These features can be mutually contrary to each other. Further, a motor provided with a brush can be used as the drive source of the fuel pump, and the durability of the brush is important for increasing operating life and decreasing costs. However, the brush can be prone to deterioration due to electric discharge and wear between the brush and a commutator.

Also, in order to reduce the size of the fuel pump, the material and structure of the brush have been altered to account for the reduced area of the brush. However, these different brush materials and brush structures can increase costs, which is undesirable.

Furthermore, to satisfy a recent demand for low emission and low fuel consumption, idle stop system and hybrid electric vehicles have been employed in increasing numbers. However, for the idle stop system and the hybrid electric vehicle, since there is an increase in the number of times that an engine (internal combustion engine) is automatically stopped and started, the fuel pump is stopped and started an increased number of times. Further, in the hybrid electric vehicle, a power supply (battery) for driving the fuel pump is different from a power supply (battery) for starting the engine, so there are circumstances that the drive voltage at the time of starting the fuel pump is not reduced by the driving of the starter (cranking of the engine) but becomes higher than ever before.

The electric discharge between the brush and the commutator, which causes the brush of the fuel pump to deteriorate, tends to easily develop due to a rush current at the time of startup, and as a drive voltage at the time of startup increases, a rush current increases, and hence the electric discharge tends to easily develop. Thus, when the number of times that the fuel pump is started and the drive voltage at the time of startup increases, stress applied to the brush by the rush current is increased by a corresponding amount to reduce the durability of the fuel pump. Hence some countermeasures are necessary.

Several proposals have been made for enhancing the durability of the fuel pump. For example, JP-B 60-37313 discloses that when a fuel injection quantity (injection pulse width) during the operation of an engine becomes at most a predetermined value, the drive voltage of the fuel pump is reduced (see pages 1 and 2, etc.). Moreover, JP-B 61-1621 discloses that when an engine is rotated at a low speed and under a low load, the drive voltage of the fuel pump is reduced (see page 1, etc.).

The technologies disclosed in these patent documents is based on the concept that the drive voltage of a fuel pump is reduced in an operating range in which a required fuel quantity is small to reduce a drive current to thereby achieve an elongated life. However, it is desirable to further extend the operating life of the fuel pump employing these technologies.

In other words, as described above, the drive current of the fuel pump is greatly increased because of the rush current at the time of startup, and the stress applied to the brush at the time of startup becomes larger as the drive current becomes larger. Both of the technologies disclosed in the patent document 1, 2 are technology for controlling the drive voltage of the fuel pump after the engine is started (after the fuel pump is started). Therefore, these technologies have little to no effect on the stress applied to the brush due to the rush current at the time of starting the fuel pump.

A brush-less motor can be used as the drive source of the fuel pump in place of a motor provided with a brush as disclosed in the JP-A 03-179158. As such, the durability of the fuel pump can be improved. However, construction of the drive circuit of the brush-less motor is complex and hence increases cost.

The present disclosure is made in consideration of these circumstances. Hence, the object of the present disclosure is to provide in a system using a motor provided with a brush as the drive source of the fuel pump such a drive control device of a fuel pump as can reduce stress applied to a brush by a rush current at the time of starting a fuel pump and can balance the mutually contradictory features of elongated life, reduced size, and reduced cost of the fuel pump.

SUMMARY

A drive control device of a fuel pump is disclosed. The fuel pump is for sucking fuel in a fuel tank supplying the fuel to an internal combustion engine, and uses a motor with a brush as a drive source thereof. The drive control device includes a starting current reduction control device that starts the fuel pump in a state where a drive current of the fuel pump is reduced.

Furthermore, a drive control device is disclosed for a fuel pump for sucking fuel in a fuel tank of a vehicle, supplying the fuel to an internal combustion engine, and using a motor provided with a brush as a drive source thereof. The drive control device includes an idle stop control device that performs an idle stop for stopping the internal combustion engine and the fuel pump when a specified idle stop condition is satisfied while the vehicle is stopped. Thereafter, the idle stop control device starts the fuel pump to automatically start the internal combustion engine when a driver performs a specified operation of starting the vehicle. The idle stop control device predicts and/or detects a stress applied to the brush, a degree of deterioration of the brush, a rush current, a rush current peak value, a rush current duration, a state of the internal combustion engine, or a state of the vehicle at a time of starting the fuel pump. Furthermore, the idle stop control device switches between stop inhibition control of continuously driving the fuel pump without stopping the fuel pump even at a time of idle stop and control of stopping the fuel pump accordingly.

Moreover, a drive control device is disclosed for a fuel pump for sucking fuel in a fuel tank, supplying the fuel to an internal combustion engine, and using a motor provided with a brush as a drive source thereof. The drive control device includes an idle stop control device that performs an idle stop for stopping the internal combustion engine and the fuel pump when a specified idle stop condition is satisfied while a vehicle is stopped. Thereafter, the idle stop control device starts the fuel pump to automatically start the internal combustion engine when a driver performs a specified operation of starting the vehicle. The idle stop control device predicts and/or detects stress applied to a brush, a degree of deterioration of the brush, a rush current, a rush current peak value, a rush current duration, a state of the internal combustion engine, or a state of the vehicle at a time of starting the fuel pump. The idle stop control device also varies a frequency with which the fuel pump is stopped by the idle stop accordingly.

DETAILED DESCRIPTION OF THE PREFERRED EMBODIMENTS

Several embodiments of the present disclosure are described below as employed in a hybrid electric vehicle. However, it will be appreciated that the subject matter of the present disclosure can be useful for any suitable vehicle without departing from the scope of the present disclosure.

First Embodiment

Figure 1:
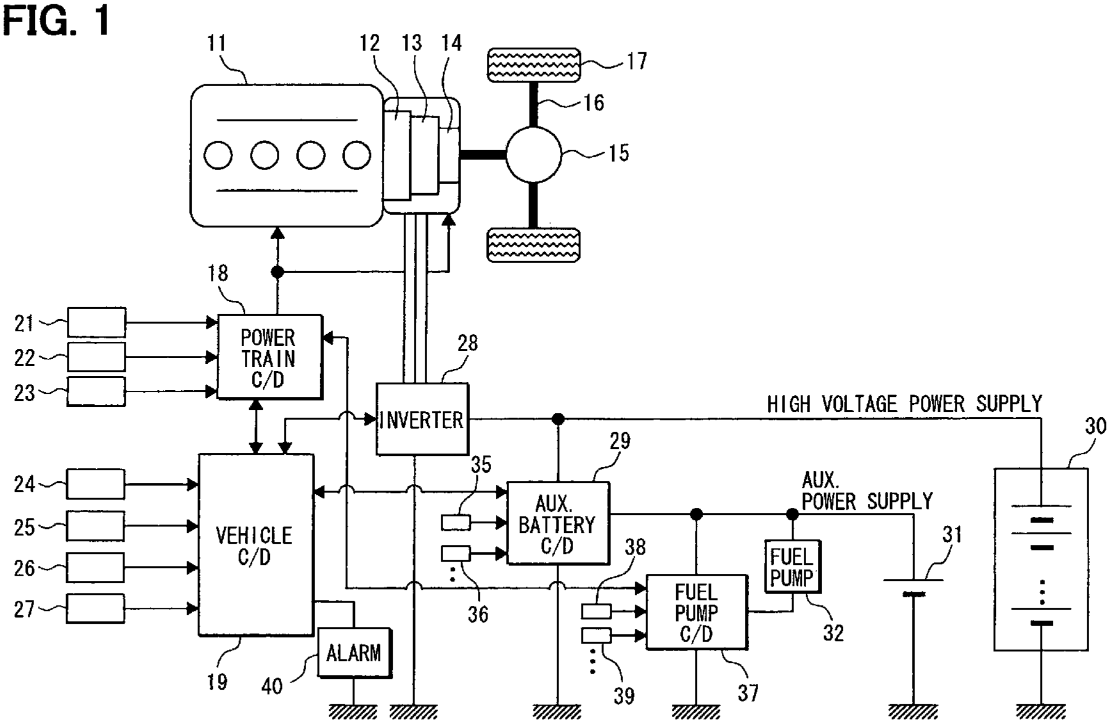
FIG. 1 is a schematic diagram of a vehicle drive system in a first embodiment of the present disclosure.

A first embodiment of the present disclosure will be described with reference to FIG. 1 to FIG. 10. FIG. 1 shows the construction of a vehicle drive control system of a hybrid electric vehicle. An AC motor 12 used for an engine 11 (internal combustion engine) and a starter is mounted as a drive source in the hybrid electric vehicle, and the power of the AC motor 12 is transmitted to a differential device 15 via a torque converter 13 and a transmission 14 and is further transmitted to a driving wheel 17 via a drive shaft 16.

A power train control device 18 controls the intake air volume, the fuel injection quantity, and the ignition timing of the engine 11 on the basis of the driving state of the engine detected by a crank angle sensor 21, an intake air volume sensor 22, a cooling water sensor 23, and the like and the information of the state of the vehicle sent from a vehicle control device 19 to control the output torque of the engine 11 and torque generated by the AC motor 12, and further controls the state of lockup of the torque converter 13 and the transmission ratio of the transmission 14.

On the other hand, the vehicle control device 19 controls the driving state of the vehicle on the basis of the output signals of various kinds of sensors such as an accelerator pedal sensor 24, a shift sensor 25, a vehicle speed sensor 26, and a brake master cylinder pressure sensor 27, and the information of the driving state of the engine 11 sent from the power train control device 18. Specifically, the vehicle control device 19 controls the engine 11, the AC motor 12, the transmission 14, a high-voltage DC battery 30, an auxiliary battery 31, and the like simultaneously via the power train control device 18, an inverter 28, and an auxiliary battery control device 29 (DC/DC converter). The vehicle control device 19 functions as an idle stop control device for performing idle stop when specified idle stop conditions are satisfied. The vehicle control device 19 also controls start, acceleration assist, regeneration at the time of deceleration, and the like.

For example, when a driver performs a specified operation to start the vehicle (pressing an acceleration pedal) in the state of idle stop, the vehicle control device 19 starts the AC motor 12 (starter) to increase the rotational speed of the engine 11 to a specified rotational speed, and then starts a fuel pump 32 via a fuel pump control device 37. At the same time, the vehicle control device 19 starts fuel injection control and ignition control by the power train control device 18 and transmits the power thereof to the driving wheel 17 via the torque converter 13, the transmission 14, and the differential device 15 to start the vehicle.

The auxiliary battery control device 29 controls the charge quantity of the auxiliary battery 31 on the basis of a signal from the vehicle control device 19 and the output signals of the various kinds of sensors such as an auxiliary battery current sensor 35, an auxiliary battery temperature sensor 36, and the like. Moreover, the vehicle control device 19 is mounted with a self-diagnosis function, and when the vehicle control device 19 detects abnormality or failure of the respective parts of the vehicle drive control system, the vehicle control device 19 displays the contents of the abnormality or the failure on the display part 40 (alarm device) to alarm the driver of the situation.

The fuel pump 32 sucks fuel in the fuel tank (not shown) and supplies the fuel to the engine 11. The fuel pump 32 has a DC motor (not shown) provided with a brush built therein as a drive source and is driven by a power supply voltage that is the voltage of the auxiliary battery 31. A fuel pump control device 37 for controlling the fuel pump 32 controls the drive current of the fuel pump 32 on the basis of the output signals of the auxiliary battery voltage sensor 38, a fuel pump coil temperature sensor 39, and the like.

Figure 2:
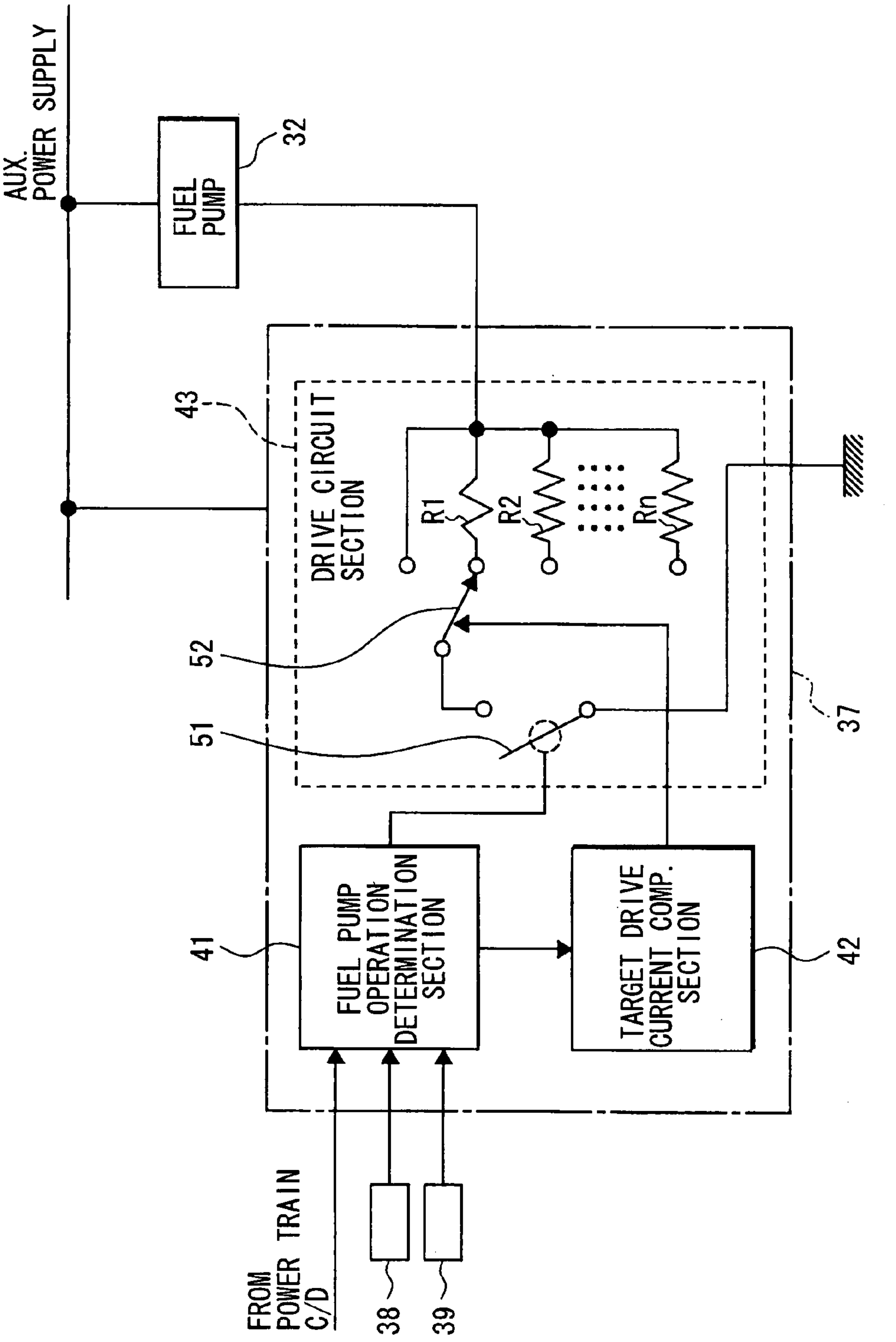
FIG. 2 is a schematic diagram of the circuit construction of a fuel pump control device of the first embodiment of the present disclosure.

Further, when the fuel pump control device 37 starts the fuel pump 32, the fuel pump control device 37 functions as a startup current reduction control device that reduces the drive current of the fuel pump 32 to start the fuel pump 32 and is constructed as shown in FIG. 2. That is, the fuel pump control device 37 includes a fuel pump operation determination section 41 that determines the operating state of the fuel pump 32 on the basis of the output signals of the auxiliary battery voltage sensor 38, the fuel pump coil temperature sensor 39, a signal from the power train control device 18, and the like. The fuel pump control device 37 further includes a target drive current computation section 42 that computes a target drive current Itag on the basis of the determination result of the fuel pump operation determination section 41. Furthermore, the fuel pump control device 37 includes a drive circuit section 43 that switches the resistors R1, R2, . . . , Rn of a current path by a resistor selector switch 52 so as to make the drive current of the fuel pump 32 coincide with the target drive current Itag. The functions of these sections 41, 42, 43 are realized by respective routines to be described later. While the fuel pump 32 is being stopped, a current passing switch 51 of the drive circuit section 43 is held in an OFF state to interrupt the passage of current to the fuel pump 32.

In the hybrid electric vehicle like this first embodiment, the number of times that the engine 11 is automatically stopped and started by idle stop and the like is increased and the fuel pump 32 is stopped and started in operatively connection with the automatic stop and start of the engine 11. Therefore, the number of times that the fuel pump 32 is started tends to be increased greatly. Further, in the hybrid electric vehicle, a power source for driving the fuel pump 32 (auxiliary battery 31) and a power source (high-voltage DC battery 30) of a starter (AC motor 12) for starting the engine 11 belong to different systems, so the drive voltage at the time of starting the fuel pump 32 is not reduced by driving the starter (cranking of the engine 11) but is made higher than in a usual vehicle.

The electric discharge between a brush and a commutator, which causes the deterioration of the brush of the fuel pump 32, tends to be developed by a rush current at the time of startup, and as the drive voltage at the time of startup becomes higher, the rush current become larger and hence electric discharge easily occurs. Thus, when the number of times that the fuel pump 32 is started becomes larger or the drive voltage at the time of startup becomes higher, stress applied to the brush by the rush current increases by just that much to reduce the durability of the fuel pump 32.

Figure 3:
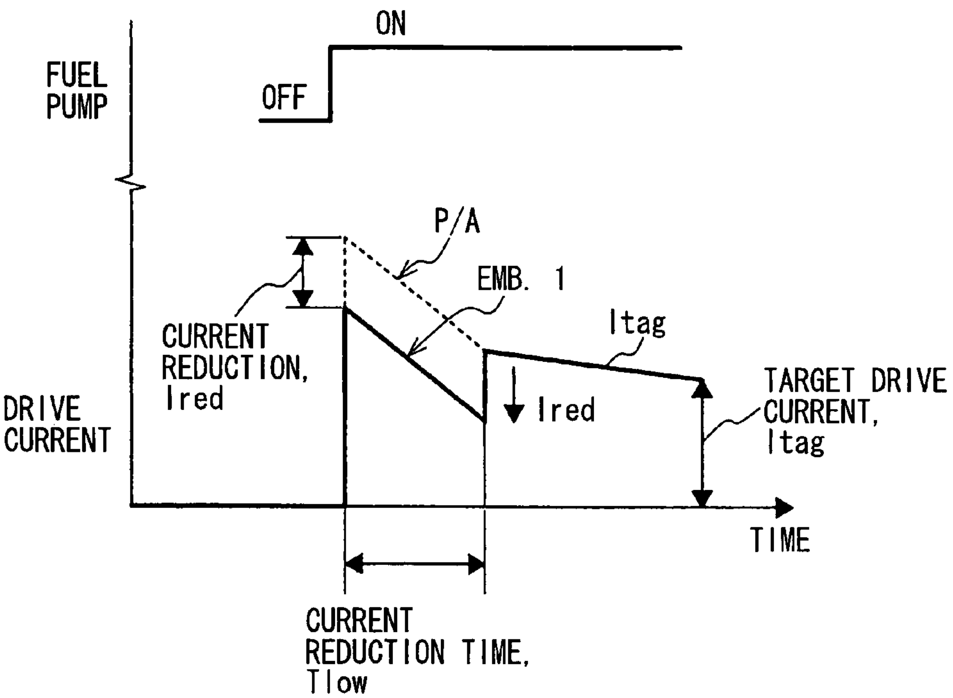
FIG. 3 is a time chart illustrating the behavior of a drive current of the fuel pump at a timing of starting a drive current reduction mode of the first embodiment of the present disclosure.

Thus, in this first embodiment, when the fuel pump control device 37 starts the fuel pump 32, the fuel pump control device 37 performs the respective routines to be described later for the purpose of reducing the stress applied to the brush by the rush current at the time of startup, thereby starting the fuel pump 32 in a state in which, as shown in FIG. 3, the drive current of the fuel pump 32 is reduced until a specified current reducing time Tlow passes. The contents of processing of the respective routines performed by the fuel pump control device 37 will be described. The processing of these respective routines may be performed by the vehicle control device 19 or the power train control device 18.

[Main Routine of Fuel Pump Control]

Figure 4:
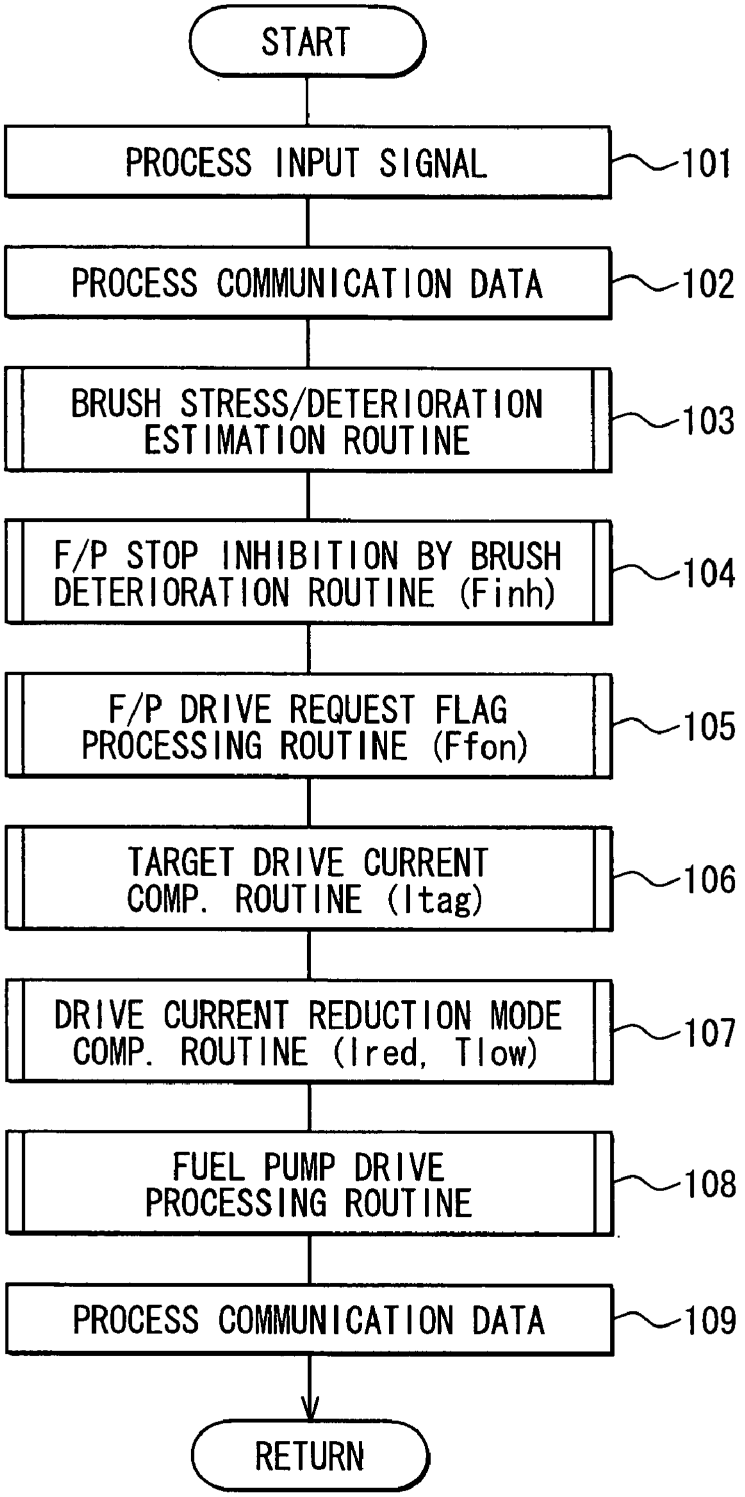
FIG. 4 is a flow chart showing the processing flow of the main routine of fuel pump control of the first embodiment of the present disclosure.

The main routine of fuel pump control shown in FIG. 4 is executed at specified intervals within a period during which the ignition switch is ON. When this routine is started, first, in step 101, the output signals of the auxiliary battery voltage sensor 38 and the fuel pump coil temperature sensor 39 are read and subjected to the processing of A/D conversion and the like. Then, in the next step 102, communication data transmitted between the vehicle control device 19, the auxiliary battery control device 29, and the power train control device 18 is processed.

Figure 5:
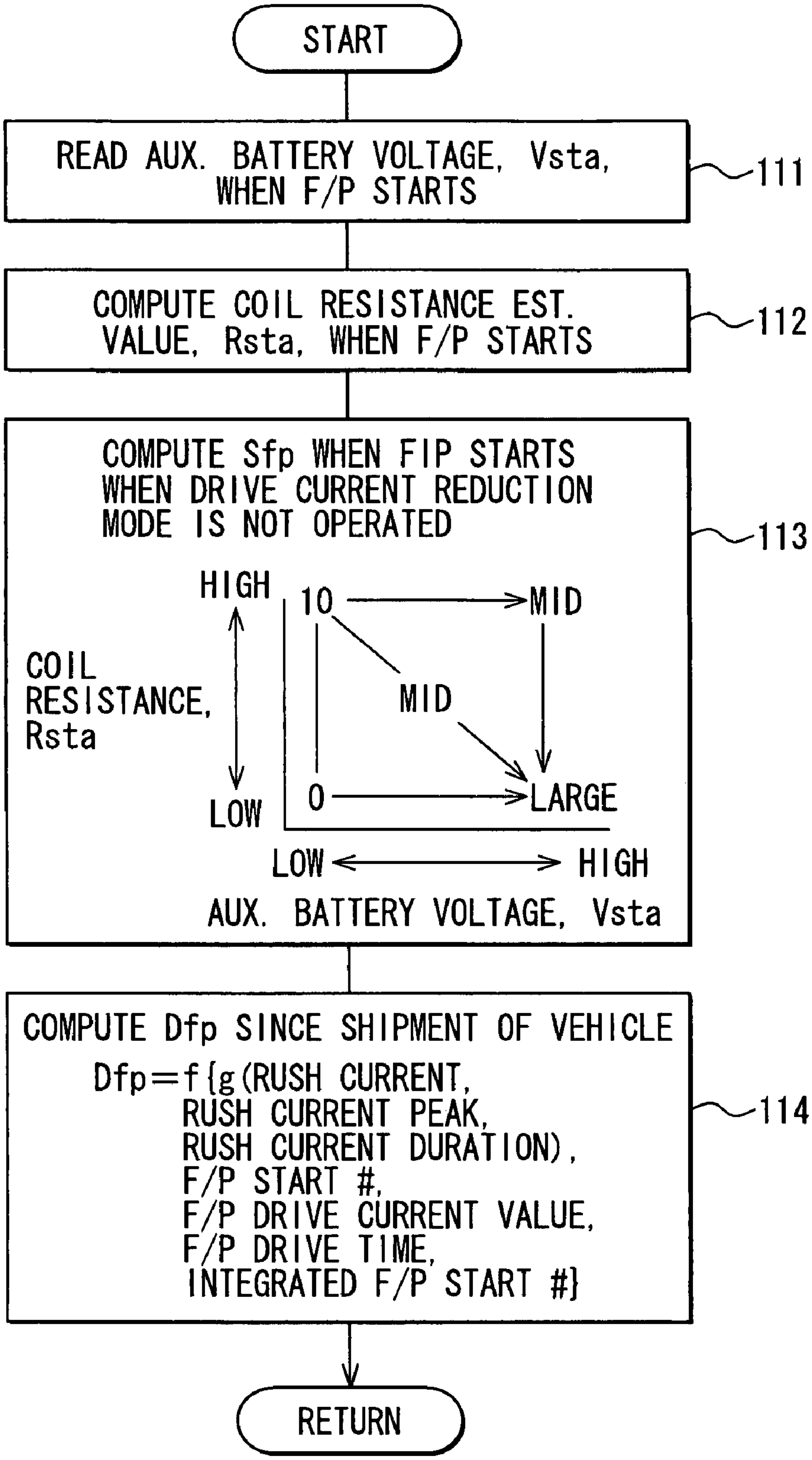
FIG. 5 is a flow chart showing the processing flow of a brush stress/deterioration estimation routine of the first embodiment of the present disclosure.

Thereafter, the routine proceeds to step 103 where a brush stress/deterioration estimation routine is executed to compute a brush deterioration estimated quantity Dfp (degree of deterioration of brush) after the shipment of the vehicle until the present time. (The routine of step 103 is described in greater detail below and is shown in FIG. 5).

Figure 6:
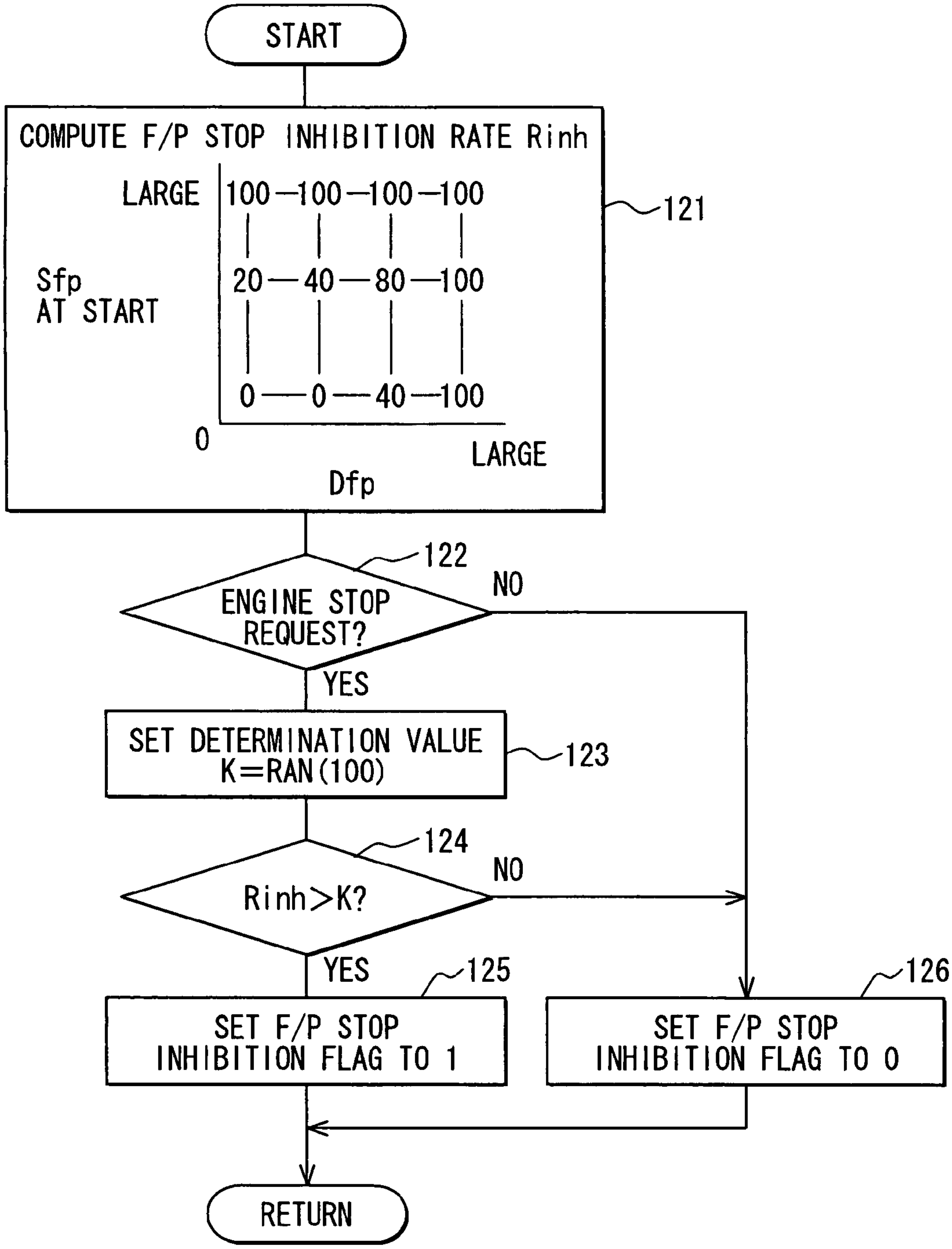
FIG. 6 is a flow chart showing the processing flow of a routine of determining stop inhibition by brush deterioration of the first embodiment of the present disclosure.

In the next step 104, a stop prohibition determination routine is executed to determine whether or not the stopping of the fuel pump 32 at the time of idle stop is performed. (The routine of step 104 is described in greater detail below and is shown in FIG. 6.)

Figure 7:
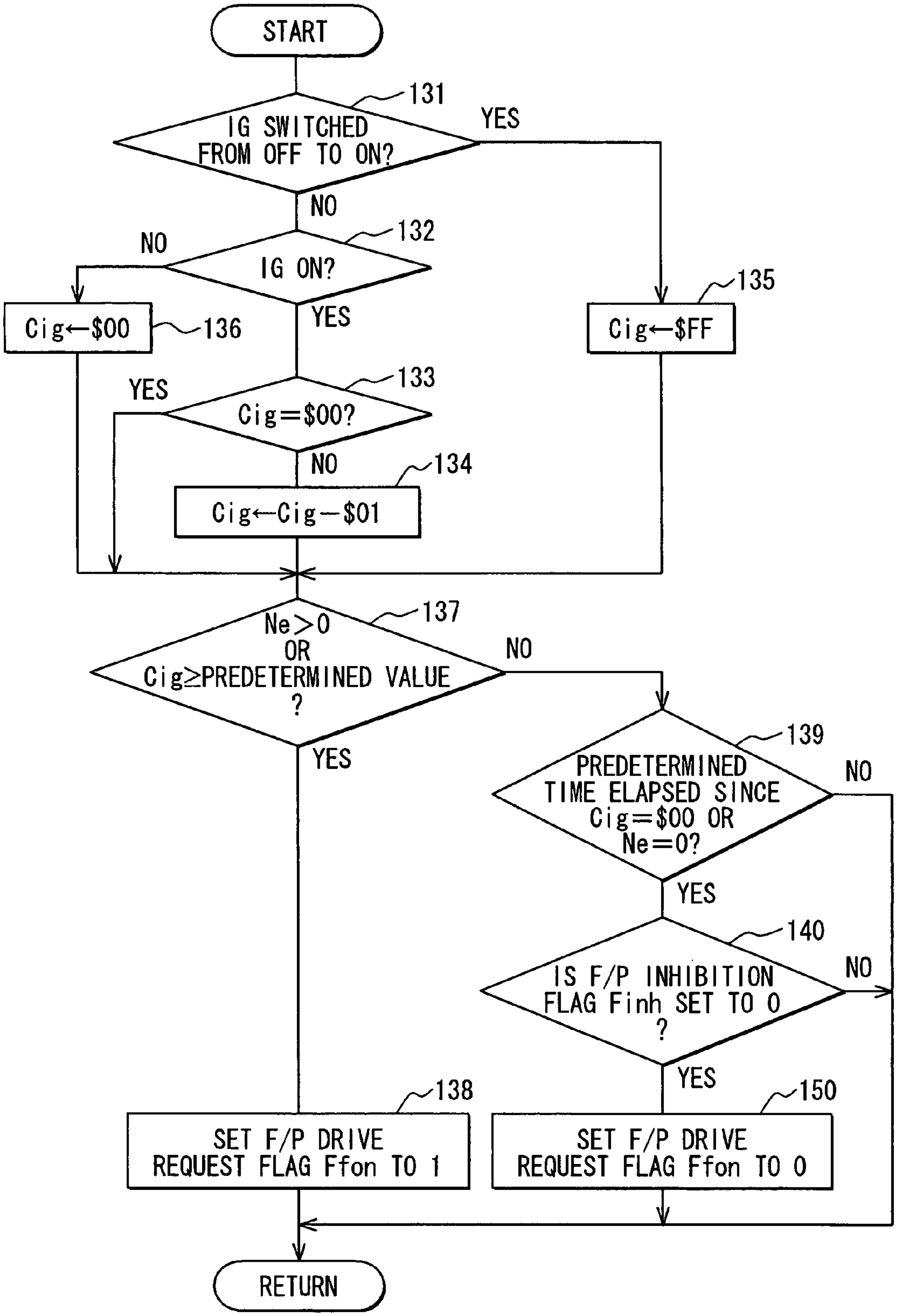
FIG. 7 is a flow chart showing the processing flow of an F/P drive request flag processing routine of the first embodiment of the present disclosure.

Thereafter, the routine proceeds to step 105 where a fuel pump ("F/P") drive request flag processing routine is executed to set/reset a F/P drive request flag showing the presence or absence of a request of driving the fuel pump 32. (The routine of step 105 is described in greater detail below and is shown in FIG. 7.)

Figure 8:
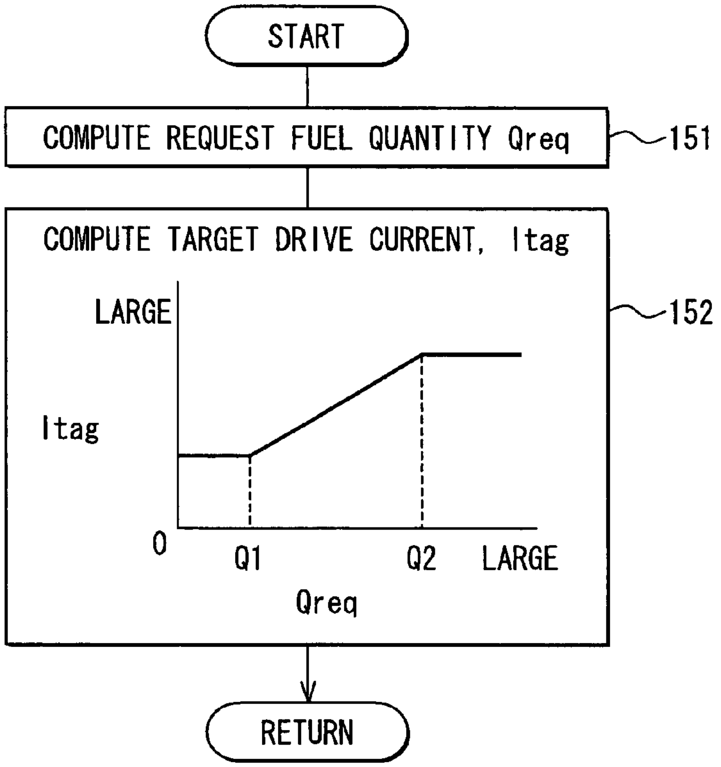
FIG. 8 is a flow chart showing the processing flow of a target drive current computation routine of the first embodiment of the present disclosure.

Next, the routine proceeds to step 106 where a target drive current computation routine is executed to compute a target drive current Itag responsive to a required fuel quantity Qreq. (The routine of step 106 is to be described in greater detail below and is shown in FIG. 8.)

Figure 9:
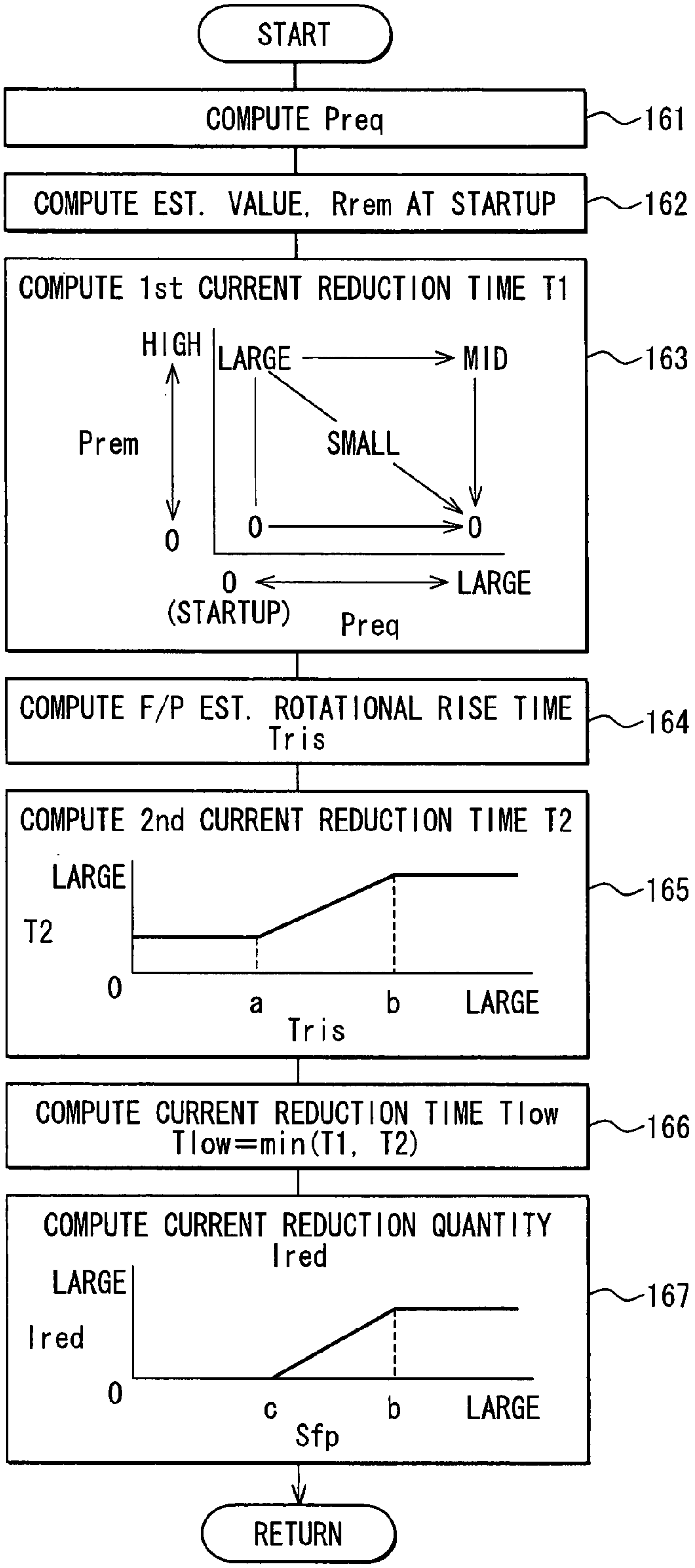
FIG. 9 is a flow chart showing the processing flow of a drive current reduction mode computation routine of the first embodiment of the present disclosure.

Thereafter, the routine proceeds to step 107 where a drive current reduction mode computation routine is executed to compute a current reduction time Tlow and a current reduction quantity Ired. (The routine of step 107 is described in greater detail below and is shown in FIG. 9.)

Figure 10:
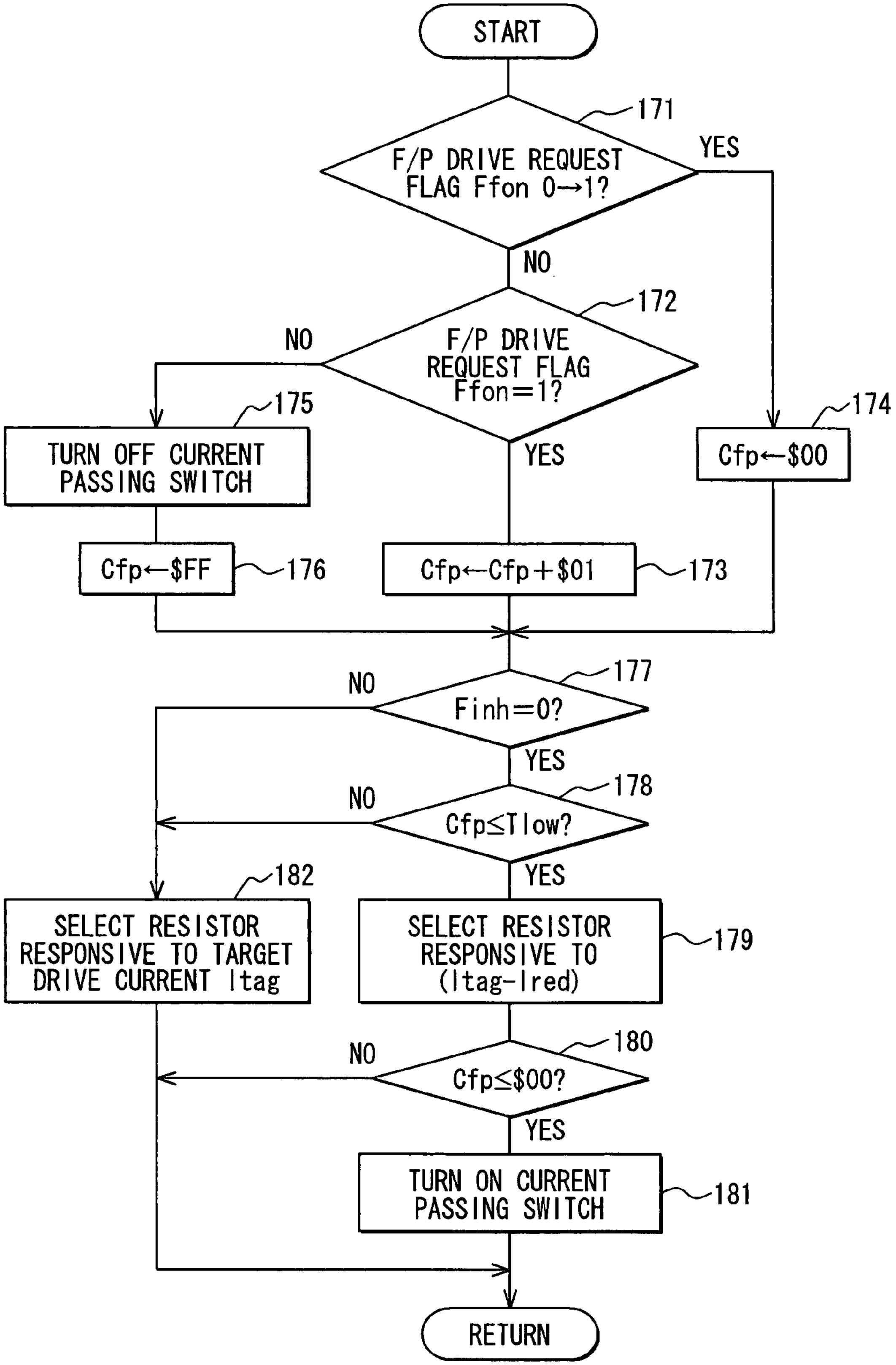
FIG. 10 is a flow chart showing the processing flow of a fuel pump drive processing routine of the first embodiment of the present disclosure.

Thereafter, the routine proceeds to step 108 where a fuel pump drive processing routine is executed to switch the resistors R1, R2, . . . , Rn of a current passing path so as to make the drive current of the fuel pump 32 coincide with the target drive current Itag to thereby drive the fuel pump 32. (The routine of step 108 is described in greater detail below and is shown in FIG. 10.)

Subsequently, the routine proceeds to step 109 where communication data transmitted between the vehicle control device 19, the auxiliary batter control device 29, and the power train control device 18 is processed. Then, this routine is finished.

[Brush Stress/Deterioration Estimation Routine]

One embodiment of a brush stress/deterioration estimation routine (step 103 of FIG. 4) is shown FIG. 5. This routine functions as means for estimating the degree of deterioration of brush. When this routine is started, first, in step 111, the voltage Vsta (corresponding to the power supply voltage of the fuel pump 32) of the auxiliary battery 31 at the time of startup, which is detected by the auxiliary battery voltage sensor 38, is read. Then, the routine proceeds to step 112 where a coil resistance estimated value Rsta at the time of startup is computed on the basis of the coil temperature of the fuel pump 32, which is detected by the fuel pump coil temperature sensor 39. Alternatively, the coil resistance estimated value Rsta at the time of startup may be computed on the basis of information affecting the coil temperature of the fuel pump 32 (e.g., idle stop time, F/P current passing time, fuel temperature, outside temperature).

Thereafter, the routine proceeds to step 113 where a brush stress estimated quantity Sfp at the time of startup in a case where drive current reduction mode is not operated (drive current reduction control is not performed) is computed from a map. In this case, the brush stress at the time of startup varies in response to an auxiliary battery voltage and a coil resistance at the time of startup, and as the auxiliary battery voltage becomes higher, the brush stress at the time of startup becomes larger. That is, there is a characteristic that in a range in which an auxiliary battery voltage at the time of startup is higher, and as the coil resistance at the time of startup becomes lower, the brush stress at the time of startup becomes larger. Thus, the map used for computing a brush stress estimated quantity Sfp at the time of startup is made as a two-dimensional map having parameters of an auxiliary battery voltage Vsta at the time of startup and a coil resistance estimated value Rsta at the time of startup. A brush stress estimated quantity Sfp at the time of startup responsive to an auxiliary battery voltage Vsta at the time of startup and a coil resistance estimated value Rsta at the time of startup is computed by the use of this map.

Thereafter, the routine proceeds to step 114 where a brush deterioration estimated quantity Dfp after the shipment of the vehicle until the present time is computed by the use of a map or a function. The map or the function for computing this brush deterioration estimated quantity Dfp is made by using the following parameters: 1) a computation value of a weighted integrated function g having variables of a rush current, a rush current peak value, and a rush current duration; 2) the number of times that F/P is started; 3) a F/P drive current value; 4) F/P drive time; and 5) the integrated value of the number of times that F/P is started. The weighted integrated function g multiplies a rush current, a rush current peak value, and a rush current duration by a factor ki varying according to the magnitudes of current value and duration and then integrates them. The factor ki is set so as to increase as the current value and the duration increase. The deterioration of the brush is accelerated as a rush current is increased. However, the deterioration of the brush is not proportional to the current quantity but is accelerated more than a proportional relationship by an increase in the current quantity, so the brush deterioration estimated quantity Dfp can be computed with higher accuracy by the use of the integrated values of the number of times that the F/P is started and the rush current.

In this case, when the brush deterioration estimated quantity Dfp after the shipment of the vehicle until the present disclosure becomes a predetermined value, an alarm may be given to the driver by displaying the alarm on an alarm display part 40. In this manner, it is possible to inform the driver of a fact that the brush comes near to its end of life and hence to urge the drive to repair the bush before the fuel pump 32 fails to make the vehicle unable to run. At this time, in addition to displaying an alarm on the alarm display part 40, the alarm may be stored as an abnormality in the memory of a self-diagnosis function of the vehicle control device 19.

In this regard, a method for computing a brush stress estimated quantity Sfp at the time of startup is not limited to the method in step 113 but may be computed, for example, by the following methods.

[Other Method (No. 1)]

In consideration of a fact that an effect to brush stress by the auxiliary battery voltage at the time of startup is larger than an effect to brush stress by the coil resistance at the time of startup, a brush stress estimated quantity Sfp at the time of startup is computed on the basis of only the auxiliary battery voltage at the time of startup. This method provides an advantage of simplifying computation processing.

[Other Method (No. 2)]

At the time of normal start by the user's operation of starting the ignition switch, the brush stress estimated quantity Sfp is set to a small value, and at the time of automatic startup from idle stop, the brush stress estimated quantity Sfp is set to a large value. Generally, a voltage drop of the auxiliary battery 31 at the time of automatic startup performed in a state where the engine 11 is being idled become smaller than at the time of normal startup, so the brush stress estimated quantity Sfp becomes larger at the time of automatic startup than at the time of normal startup.

[Other Method (No. 3)]

At the time of starting the fuel pump 32 while driving the AC motor 12 (starter) (when the ignition switch is ON and the starter is ON), the brush stress estimated quantity Sfp is set to a middle value. At the time of starting the fuel pump 32 without driving the AC motor 12 (starter), (when the ignition switch is ON and the starter is OFF), the brush stress estimated quantity Sfp is set to a large value. This is due to considering a difference in the voltage drop of the auxiliary battery 31 at the time of startup.

[Routine for Determining Stop Inhibition by Brush Deterioration]

A routine for determining stop inhibition by brush deterioration, shown in FIG. 6, is a subroutine executed in step 104 in FIG. 4. When this routine is started, first, in step 121, a F/P stop inhibition rate Rinh depending on the brush stress estimated quantity Sfp and the brush deterioration estimated quantity Dfp, which are computed by the brush stress deterioration estimation routine in FIG. 5, are computed with reference to a F/P stop inhibition rate computation map having a brush stress estimated quantity Sfp and a brush deterioration estimated quantity Dfp at the time of startup as parameters.

This F/P stop inhibition rate Rinh is a frequency (rate) with which the fuel pump 32 is stopped at the time of idle stop. When the F/P stop inhibition rate Rinh=100%, there is brought about a state in which the stopping of the fuel pump 32 is inhibited every time even at the time of idle stop. When the F/P stop inhibition rate Rinh=50%, there is brought about a state in which the stopping of the fuel pump 32 is inhibited at the rate of one idle stop to two idle stops. The map used for computing this F/P stop inhibition rate Rinh is set in such a way that as the brush stress estimated quantity Sfp and the brush deterioration estimated quantity Dfp increases, the F/P stop inhibition rate Rinh increases.

Thereafter, the routine proceeds to step 122 where it is determined whether or not an engine stop request is made. If it is determined that an engine stop request is not made, the routine proceeds to step 126 where a F/P stop inhibition flag Finh is set to zero (0).

In contrast to this, if it is determined in step 122 that an engine stop request is made, the routine proceeds to step 123 where a determination value K is set at random to a value within a range of from 1 to 99 by the use of a random number generation function RAN(100) for generating a random number smaller than 100. Then, the routine proceeds to step 124 where the F/P stop inhibition rate Rinh is compared with the determination value K. If the F/P stop inhibition rate Rinh is larger than the determination value K, the routine proceeds to step 125 where the F/P stop inhibition flag Finh is set to one (1), which means "that F/P stop is inhibited". If the F/P stop inhibition rate Rinh is not larger than the determination value K, the routine proceeds to step 126 where the F/P stop inhibition flag Finh is set to zero (0), which means "that F/P stop is allowed".

In this regard, when the F/P stop inhibition flag Finh is set to one (1), which means "that F/P stop is inhibited", an alarm may be displayed on the alarm display part 40 to give the driver the alarm. In this manner, it is possible to inform the driver of a fact that the brush comes near to the end of its life and hence to urge the driver to repair the brush before the fuel pump 32 fails to make the vehicle unable to run. At this time, in addition to an alarm displayed on the alarm display part 40, this alarm may be stored as an abnormality in the memory of the self-diagnosis function of the vehicle control device 19.

[F/P Drive Request Flag Processing Routine]

A F/P drive request flag processing routine shown in FIG. 7 is a subroutine executed in step 105 in FIG. 4. When this routine is started, first, in step 131, it is determined whether or not it is immediately after changing the ignition switch (hereinafter referred to as "IG switch") from the OFF state to the ON state. If it is determined that it is immediately after changing the ignition switch from the OFF state to the ON state, the routine proceeds to step 135 where an elapse time counter Cig for counting a time that elapses after the IG switch is changed from the OFF state to the ON state is set to a maximum value ($FF).

In contrast, if it is determined in the step 131 that it is not immediately after changing the IG switch from the OFF state to the ON state, the routine proceeds to step 132 where it is determined whether or not the IG switch is in the ON state. If it is determined that the IG switch is in the OFF state, the routine proceeds to step 136 where the elapse time counter Cig is set to a minimum value ($00).

If it is determined in step 132 that the IG switch is in the ON state, the routine proceeds to step 133 where it is determined whether or not the elapse time counter Cig is decremented to the minimum value ($00). If the determination result is NO, the proceeds to step 134 where the elapse time counter Cig is decremented by "$01". By the processing of the steps 131-136, the processing of setting the elapse time counter Cig to the maximum value ($FF) immediately after the IG switch is changed from the OFF to the ON state and thereafter decrementing the value of the elapse time counter Cig by "$01" every time this routine is started is performed repeatedly until the value of the elapse time counter Cig becomes the minimum value ($00).

Then, in the next step 137, it is determined whether or not engine speed Ne>0 (that is, engine is rotating) or whether elapse time counter Cig≧a predetermined value. If it is determined that engine speed Ne>0 (that is, while the engine is rotating) or that elapse time counter Cig≧a predetermined value, the routine proceeds to step 138 where a F/P drive request flag Ffon is set to "1." This means that a F/P drive request is made, and then this routine is finished.

Then, if it is determined in the step 137 that engine speed Ne=0 (that is, engine stopped) or that elapse time counter Cig<a predetermined value, the routine proceeds to step 139 where it is determined whether or not a specified time elapses after the elapse time counter Cig=the minimum value ($00) or after the engine speed Ne=0 (engine stopped). If the determination result is NO, the following processing is not performed and this routine is finished.

On the other hand, if it is determined in step 139 that the specified time elapses after the elapse time counter Cig=the minimum value ($00) or that the engine speed Ne=0 (engine stopped), the routine proceeds to step 140 where it is determined whether or not F/P stop inhibition flag Finh is set to "0," meaning that "F/P stop is allowed". If it is determined in step 140 that the F/P stop inhibition flag Finh is set to "1," meaning that "F/P stop is inhibited", the following processing is not performed and this routine is finished. If it is determined in step 140 that the F/P stop inhibition flag Finh is set to "0," meaning that "F/P stop is allowed", the routine proceeds to step 150 where the F/P drive request flag Ffon is set to "0," meaning that a F/P drive request is not made. Then this routine is finished.

[Target Drive Current Computation Routine]

A target drive current computation routine shown in FIG. 8 is a subroutine executed in step 106 in FIG. 4. When this routine is started, first, in step 151, a fuel quantity Qreq required to generate a required torque is computed by a map and the like on the basis of the present engine speed, the required engine torque, and the target air-fuel ratio.

Thereafter, the routine proceeds to step 152 where a target drive current Itag depending on a present required fuel quantity Qreq is computed with reference to a target drive current computation table having the required fuel quantity Qreq as a parameter. In this target drive current computation table, within a specified range in which the required fuel quantity Qreq ranges from Q1 to Q2, as the required fuel quantity Qreq becomes larger, the target drive current Itag becomes larger. When the required fuel quantity Qreq is less than a predetermined value Q1, the target drive current Itag is set to a minimum value. Also, when the required fuel quantity Qreq is at least equal to another predetermined value Q2, the target drive current Itag is set to a maximum value. The minimum value of the target drive current Itag is set to a drive current required to rotate and drive the fuel pump 32 at a minimum discharge quantity, and the maximum value of the target drive current Itag is set to a drive current required to rotate and drive the fuel pump 32 at a maximum discharge quantity.

[Drive Current Reduction Mode Computation Routine]

A drive current reduction mode computation routine shown in FIG. 9 is a subroutine executed in step 107 in FIG. 4. When this routine is started, first, in step 161, a required engine torque Preq required by the driver is computed on the basis of a present accelerator position and the like.

Then, the routine proceeds to step 162 where an estimated value Prem of remaining pressure of fuel at the time of startup is computed on the basis of an idle stop time and a fuel temperature. Alternatively, in the case of automatic startup from idle stop, the estimated value Prem of remaining pressure of fuel at the time of startup may be set to a high pressure, and in the case of a normal startup by the operation of the IG switch, the estimated value Prem of remaining pressure of fuel at the time of startup may be set to a low pressure. Generally, this is because an idle stop time is relatively short, so a fuel pressure drop during idle stop is small, whereas an engine stop time before normal startup is sufficiently longer than the idle stop time. Therefore, a fuel pressure drop in a period during which the engine is stopped increases.

Thereafter, the routine proceeds to step 163 where a first current reduction time T1 depending on a present required engine torque Preq and an estimated value Prem of remaining pressure of fuel at the time of startup is computed with reference to a map for computing a first current reduction time T1 and having the parameters of the required engine torque Preq and the estimated value Prem of remaining pressure of fuel at the time of startup. This map for computing a first current reduction time T1 is set in any suitable manner. In one embodiment, for instance, as the estimated value Prem of remaining pressure of fuel at the time of startup increases, the first current reduction time T1 increases. Also, within a range in which the estimated value Prem of remaining pressure of fuel at the time of startup is high and as the required engine torque Preq decreases, the first current reduction time T1 increases.

In the next step 164, a F/P estimated rotational rise time Tris is computed on the basis of a drive voltage and a fuel viscosity (which can be substituted by fuel temperature, idle stop time, cooling water temperature, oil temperature, outside air temperature, intake air temperature, etc.).

Then, the routine proceeds to step 165 where a second current reduction time T2 depending on the F/P estimated rotational rise time Tris is computed with reference to a table for computing a second current reduction time T2 and using the F/P estimated rotational rise time Tris as a parameter. This table for computing a second current reduction time T2 is set in any suitable manner. In one embodiment for instance, the table is set such that within a specified range in which the F/P estimated rotational rise time Tris ranges from a to b, as the F/P estimated rotational rise time Tris increases, the second current reduction time T2 increases. Also, when the F/P rotational estimated rise time Tris is less than or equal, to the predetermined value a, the second current reduction time T2 is set to a minimum value. Also, when the F/P estimated rotational rise time Tris is greater than or equal to the predetermined value b, the second current reduction time T2 is set to a maximum value.

Thereafter, the routine proceeds step 166 where a comparison is made between the first current reduction time T1 and the second current reduction time T2 to select a smaller one as a final current reduction time Tlow. Then, the routine proceeds to step 167 where a current reduction quantity Ired depending on a brush stress estimated quantity Sfp at the time of startup is computed with reference to a current reduction quantity computation table having a parameter of the brush stress estimated quantity Sfp at the time of startup. In the embodiment shown, this current reduction quantity computation table is set such that, within a specified range in which the brush stress estimated quantity Sfp at the time of startup ranges from c to d, as the brush stress estimated quantity Sfp at the time of startup increases, the current reduction quantity Ired increases. Also, when the brush stress estimated quantity Sfp at the time of startup is less than or equal to the predetermined value c, the current reduction quantity Ired is set to a minimum value (0). Furthermore, when the brush stress estimated quantity Sfp at the time of startup is greater than or equal to the predetermined value d, the current reduction quantity Ired is set to a maximum value.

[Fuel Pump Drive Processing Routine]

A fuel pump drive processing routine shown in FIG. 10 is a subroutine executed in step 108 in FIG. 4. When this routine is started, first, in step 171, it is determined whether or not it is immediately after changing to a state where a F/P drive request is made. Specifically, step 171 proceeds by determining whether or not it is immediately after the F/P drive request flag Ffon is changed from "0" to "1". If it is determined that it is immediately after changing to a state where a F/P drive request is made, the routine proceeds to step 174 where a F/P drive request duration counter Cfp is set to a minimum value ($00).

In contrast, if it is determined that it is not immediately after the F/P drive request flag Ffon is changed from "0" to "1" (that it is not immediately after changing to a state where a F/P drive request is made), determination result in step 171 is "NO" and the routine proceeds to step 172. In step 172, it is determined whether or not the F/P drive request flag Ffon is set to "1," meaning that a F/P drive request is made. If it is determined that the F/P drive request flag Ffon is set to "1", the routine proceeds to step 173 where the F/P drive request duration counter Cfp is incremented by "$01". With this, the time that elapses after the F/P drive request flag Ffon is changed from "0" to "1" is counted.

If it is determined in step 172 that the F/P drive request flag Ffon is set to "0", meaning that the F/P drive request is not made, a current passing switch 51 of the drive circuit section 43 (see FIG. 2) is changed to the OFF state to stop passing current to the fuel pump 32, and in the next step 176, the F/P drive request duration counter Cfp is set to a maximum value ($FF).

In this manner, the F/P drive request duration counter Cfp is operated in steps 173, 174, or 176, and then the routine proceeds to step 177 where it is determined whether or not a drive current reduction mode inhibition flag Finh is "0". This drive current reduction mode inhibition flag Finh is a flag set or reset according to a request from the vehicle control device 19, the power train control device 18, and the auxiliary battery control device 29. When the drive current reduction mode inhibition flag Finh=0, it means that a drive current reduction mode is allowed, and when the drive current reduction mode inhibition flag Finh=1, it means that it is required to inhibit a drive current reduction mode. For example, when the voltage of the auxiliary battery 31 becomes not larger than a normal range or when the deterioration of the auxiliary battery 31 is detected, the drive current reduction mode inhibition flag Finh is set to "1" and the drive current reduction mode is inhibited.

If it is determined in step 177 that the drive current reduction mode inhibition flag Finh is set to "1" that means that the drive current reduction mode is inhibited, and the routine proceeds to step 182 where a resistor responsive to the target drive current Itag is selected from the resistors R1, R2, . . . , Rn of the drive circuit section 43 and a resistor selector switch 52 is switched to the resistor.

In contrast, if it is determined in step 177 that the drive current reduction mode inhibition flag Finh is set to "0" that means that the drive current reduction mode is allowed, and the routine proceeds to step 178 where it is determined whether or not the value of the F/P drive request duration counter Cfp is less than or equal to the current reduction time Tlow. As a result, if it is determined that the value of the F/P drive request duration counter Cfp is less than or equal to the current reduction time Tlow, it is determined that the drive current reduction mode is being performed. Then, the routine proceeds to step 179 where a current reduction quantity Ired is subtracted from the target drive current Itag at the time of normal drive. A target drive current (Itag−Ired) at the time of starting the drive current reduction mode is set. Also, a resistor responsive to the target drive current (Itag−Ired) at the time of starting the drive current reduction mode is selected from the resistors R1, R2, . . . , Rn of the drive circuit section 43. Also, the resistor selector switch 52 is switched to this resistor.

Thereafter, the routine proceeds to step 180 where it is determined whether or not the value of the F/P drive request duration counter Cfp is a minimum value ($00). If it is determined that the value of the F/P drive request duration counter Cfp is less than or equal to the minimum value ($00), it is determined that it is immediately after the F/P drive request flag Ffon is changed from "0" to "1". (In other words, it is immediately after changing to a state where a F/P drive request is made.) Thus, the routine proceeds to step 181 where the current passing switch 51 of the drive circuit section 43 is turned ON to start passing current to the fuel pump 32 to start the fuel pump 32. In this case, the fuel pump 32 is started in a state where the drive current of the fuel pump 32 is reduced to the target drive current (Itag−Ired) at the time of starting the drive current reduction mode. In this regard, if determination result in step 180 is "NO", this routine is finished without performing any processing.

A control example of this first embodiment described above will be described with reference to FIG. 3.

If the drive current reduction mode is allowed, when the fuel pump 32 is changed from the OFF state to the ON state, the current reduction time Tlow and the current reduction quantity Ired are computed. The current reduction quantity Ired is subtracted from the target drive current Itag at the time of normal drive and the target drive current (Itag−Ired) at the time of starting the drive current reduction mode is set. Then the fuel pump 32 is started in a state where the drive current of the fuel pump 32 is reduced to the target drive current (Itag−Ired) at the time of starting the drive current reduction mode. When the time that elapses after starting the drive current reduction mode is greater than the current reduction time Tlow, the drive current reduction mode is changed to the normal drive, whereby the drive current of the fuel pump 32 is controlled to the target drive current Itag at the time of normal drive. At this time, when the target drive current is changed from (Itag−Ired) to Itag, the target drive current may be gradually changed from (Itag−Ired) to Itag.

According to this first embodiment described above, in the system using the motor provided with the brush as the drive source of the fuel pump 32, when the pump 32 is started, the fuel pump 32 is started in a state where the drive current of the fuel pump 32 is reduced. Thus, it is possible to reduce brush stress applied by the rush current at the time of starting the fuel pump 32 and hence to balance the mutually contradictory advantages of elongated the life, reduced size, and reduced cost of the fuel pump 32.

Further, in this first embodiment, the brush stress estimated quantity Sfp at the time of startup is computed with reference to the two-dimensional map having the parameters of the auxiliary battery voltage Vsta at the time of startup and the coil resistance estimated value Rsta at the time of startup, and the current reduction quantity Ired at the time of starting the drive current reduction mode is computed according to the brush stress estimated quantity Sfp. Thus, the current reduction quantity Ired of the target drive current at the time of starting the drive current reduction mode can be changed appropriately according to the brush stress at the time of startup. Therefore, it is possible to reduce the brush stress without degrading the starting performance of the fuel pump 32 more than necessary.

In this disclosure, the current reduction quantity Ired at the time of starting the drive current reduction mode may be computed according to the brush stress estimated quantity Dfp from the shipment of the vehicle to the present time as is computed by the brush stress deterioration estimation routine shown in FIG. 5. In this case, it is also possible to reduce the brush stress without degrading the starting performance of the fuel pump 32 more than necessary. Needless to say, the current reduction quantity Ired at the time of starting the drive current reduction mode may be computed in consideration of the brush stress estimated quantity Sfp and the brush deterioration estimated quantity Dfp at the time of startup.

Alternatively, the current reduction time Tlow may be changed according to the brush stress estimated quantity Sfp and/or the brush deterioration estimated quantity Dfp.

Moreover, in this first embodiment, when the brush stress estimated quantity Sfp at the time of startup is less than or equal to the predetermined value c, the current reduction quantity Ired is set to the minimum value (0). Thus, the control of reducing the drive current is not performed within a range in which the brush stress at the time of startup is intrinsically small. As a result, this can prevent the starting performance of the fuel pump 32 from being degraded more than necessary.

In this disclosure, when the voltage Vsta of the auxiliary battery 31 (power supply voltage of the fuel pump 32) at the time of startup, which is read in step 111 of the brush stress deterioration estimation routine shown in FIG. 5, is at least equal to a predetermined voltage, the control of starting the fuel pump 32 in a state where the drive current of the fuel pump 32 is reduced may be performed. Here, it is only necessary to set the "specified voltage" in consideration of the relationship between the brush stress caused by the rush current at the time of startup and the drive voltage of the fuel pump 32 so as to reduce the brush stress at the time of startup within a range in which the starting performance of the fuel pump 32 can be secured. In this manner, the control of reducing the drive current is not performed within a low voltage range in which the brush stress at the time of startup is intrinsically small. As a result, this can prevent the starting performance of the fuel pump 32 from being degraded more than necessary.

Second Embodiment

Figure 11:
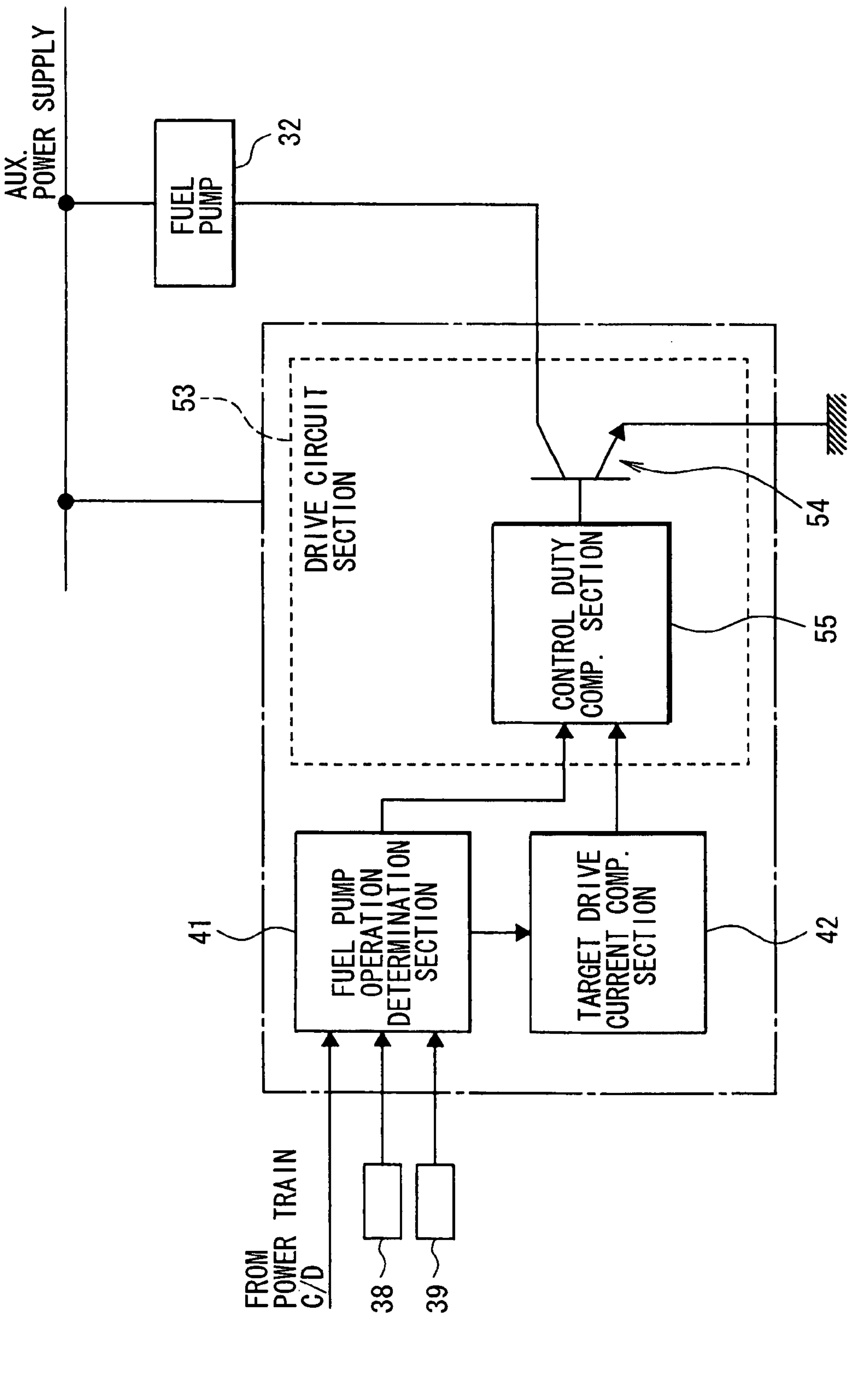
FIG. 11 is a schematic diagram of the circuit construction of a fuel pump control device of a second embodiment of the present disclosure.

In the first embodiment, the plurality of resistors R1, R2, . . . , R3 of the drive circuit section 43 disposed in the current passing path to the fuel pump 32 are switched by the resistor selector switch 52 to switch the resistance of the current passing path to control the drive current of the fuel pump 32 to the target drive current. In a second embodiment of the present disclosure shown in FIG. 11, however, a drive circuit section 53 disposed in a current passing path to the fuel pump 32 is provided with a switching element 54 for switching the passage of current to the fuel pump 32 and a control duty computation section 55 for controlling the duty of the switching element 54, and the control duty computation section 55 computes a duty responsive to the target drive current and varies the duty of the switching element 54 to control the drive current of the fuel pump 32 to the target drive current.

In this second embodiment, the drive current of the fuel pump 32 can be continuously changed by varying the duty of the switching element 54 according to the target drive current. Thus, as compared with the method of switching the resistor in the first embodiment, this second embodiment has the advantage of improving the control accuracy of the drive current of the fuel pump 32.

Third Embodiment

Figure 12:
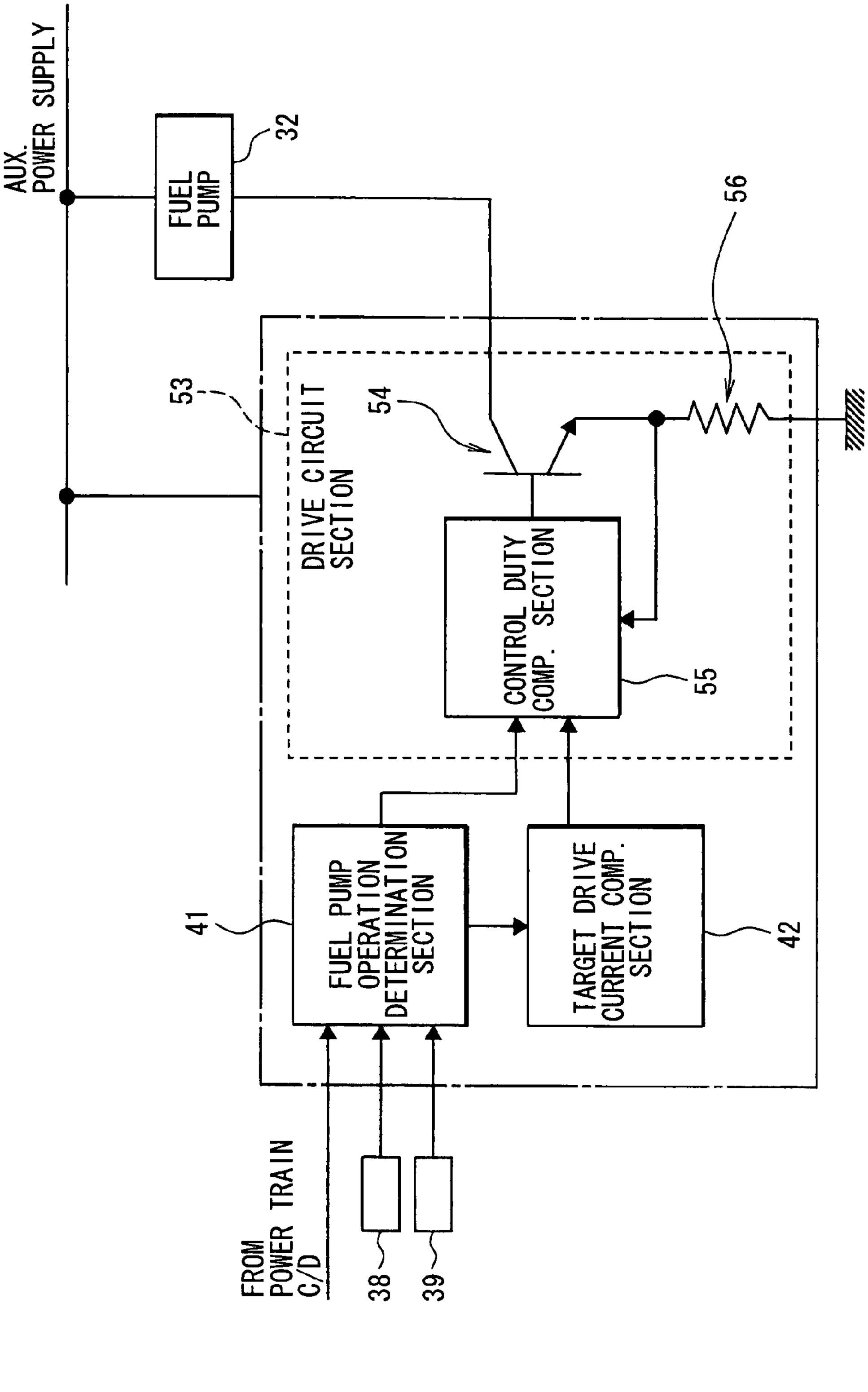
FIG. 12 is a schematic diagram of the circuit construction of a fuel pump control device of a third embodiment of the present disclosure.

A third embodiment of the present disclosure shown in FIG. 12 has a construction in which, in addition to the construction of the second embodiment, a current detection resistor 56 is interposed between the switching element 54 and a grounding terminal and in which a current value detected by the current detection resistor 56 (the terminal voltage of the current detection resistor 56) is fed back to the control duty computation section 55. In this construction, the control duty computation section 55 controls the duty of the switching element 54 by PI control or PID control so as to make the current value detected by the current detection resistor 56 coincide with the target drive current. With this, it is possible to further improve the control accuracy of the drive current of the fuel pump 32.

Fourth Embodiment

In the embodiments 1 to 3, the drive current of the fuel pump 32 is controlled to the target drive current by the switching control of the resistors R1, R2, . . . , Rn of the drive circuit section 43 or by the duty control of the switching element 54. In a fourth embodiment of the present disclosure shown in FIG. 13, however, the vehicle control device 19, the power train control device 18, or the auxiliary battery control device 29 computes a target voltage Vtag according to the target drive current (current reduction quantity Ired) and controls the voltage of the auxiliary battery 31 (power supply voltage of the fuel pump 32) so as to coincide with the target voltage Vtag to control the drive current of the fuel pump 32 to the target drive current.

Figure 13:
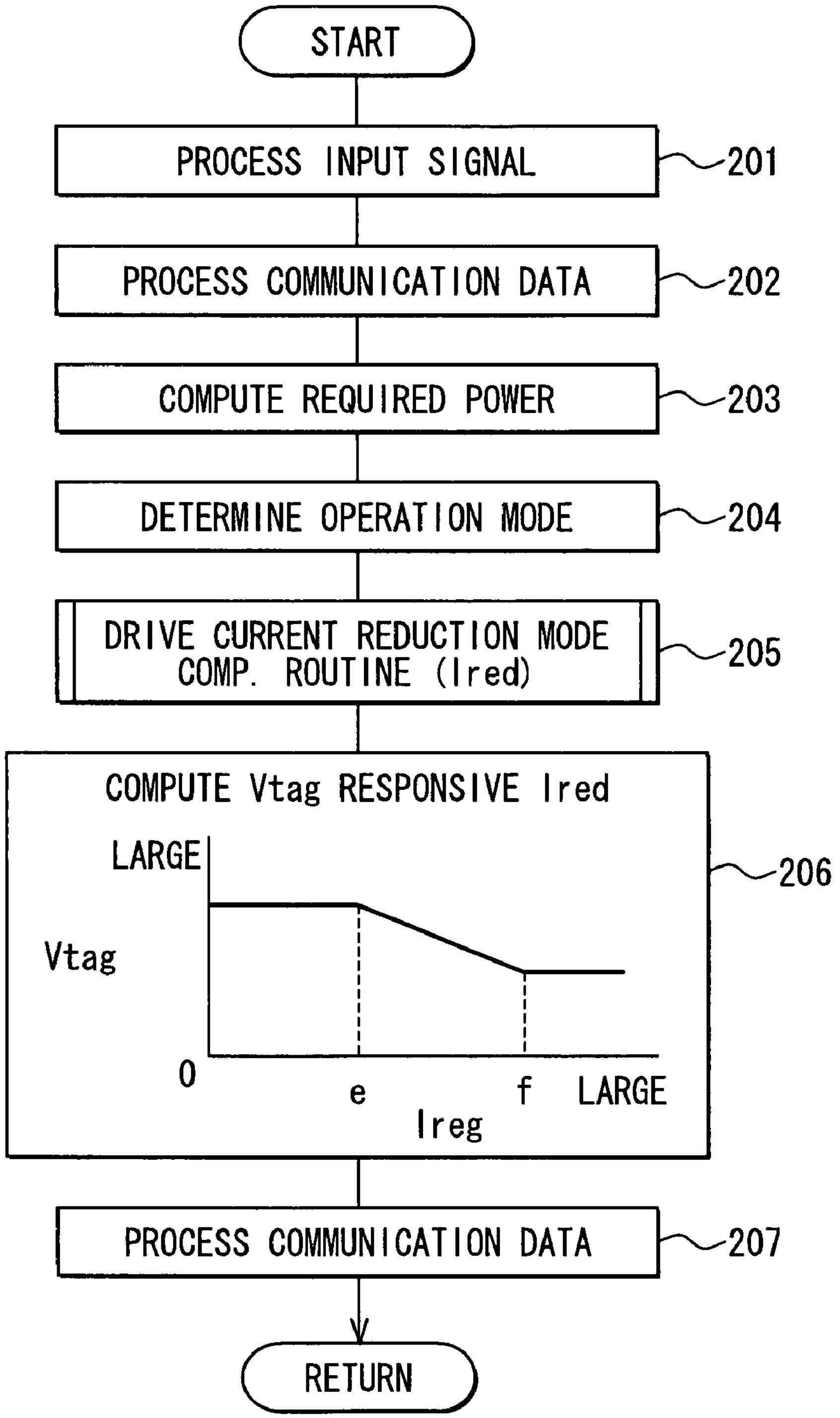
FIG. 13 is a flow chart showing the processing flow of an auxiliary battery voltage control routine of a fourth embodiment of the present disclosure.

The contents of processing of an auxiliary battery voltage control routine shown in FIG. 13 executed by the vehicle control device 19, the power train control device 18, or the auxiliary battery control device 29 will be described. This routine is executed at specified intervals within a period during which the IG switch is ON. When this routine is started, first, in step 201, the processing of reading various kinds of input signals is performed and then the routine proceeds to step 202 where communication data sent and received between the vehicle control device 19, the power train control device 18, and the auxiliary battery control device 29 is processed.

Thereafter, the routine proceeds to step 203 where required power is computed from an accelerator position and the like and in the next step 204, a present driving mode is determined. Thereafter, the routine proceeds to step 205 where the same routine as the drive current reduction mode computation routine shown in FIG. 9 is executed to compute the current reduction quantity Ired.

Then, in step 206, the auxiliary battery target voltage Vtag responsive to the current reduction quantity Ired is computed with reference to an auxiliary battery target voltage computation table having the parameter of the current reduction quantity Ired. This auxiliary battery target voltage computation table is set such that within a specified range in which the current reduction quantity Ired ranges from e to f, as the current reduction quantity Ired increases, the auxiliary battery target voltage Vtag decreases. Also, when the current reduction quantity Ired is less than or equal to a predetermined value e, the auxiliary battery target voltage Vtag is set to a maximum value. Furthermore, when the current reduction quantity Ired becomes greater than or equal to another predetermined value f, the auxiliary battery target voltage Vtag is set to a minimum value. Thereafter, the routine proceeds to step 207 where communication data sent and received between the vehicle control device 19, the power train control device 18, and the auxiliary battery control device 29 is processed.

In the fourth embodiment described above, the auxiliary battery target voltage Vtag is computed according to the target drive current (current reduction quantity Ired) and the voltage of the auxiliary battery 31 (power supply voltage of the fuel pump 32) is controlled so as to coincide with the auxiliary battery target voltage Vtag. Thus, it is possible to reduce the brush stress caused by the rush current at the time of starting the fuel pump 32 and hence to balance the mutually contradictory requests of elongating the life, reducing the size, and reducing the cost of the fuel pump 32 at a high level.

In the embodiments 1 to 4 have been described the examples in which the present disclosure is applied to the hybrid electric vehicle. However, in addition, the present disclosure can be applied also to a vehicle mounted with an idle stop system and, of course, can be applied also to a vehicle not mounted with the idle stop system.

The present disclosure has been described in an illustrative manner. It is to be understood that the terminology, which has been used, is intended to be in the nature of words of description rather than of limitation. Many modifications and variations of the present disclosure are possible in light of the above teachings. Therefore, within the scope of the appended claims, the present disclosure may be practiced other than as specifically described.

What is claimed is:

1. A drive control device of a fuel pump for sucking fuel in a fuel tank of a vehicle, supplying the fuel to an internal combustion engine, and using a motor provided with a brush as a drive source thereof comprising:

an idle stop control device that performs an idle stop for stopping the internal combustion engine and the fuel pump when a specified idle stop condition is satisfied while the vehicle is stopped and thereafter starts the fuel pump to automatically start the internal combustion engine when a driver performs a specified operation of starting the vehicle, wherein the idle stop control device at least one of predicts and detects at least one of a stress applied to the brush, a degree of deterioration of the brush, a rush current, a rush current peak value, a rush current duration, a state of the internal combustion engine, and a state of the vehicle at a time of starting the fuel pump, and wherein the idle stop control device switches between stop inhibition control of continuously driving the fuel pump without stopping the fuel pump even at a time of idle stop and control of stopping the fuel pump accordingly.

2. The drive control device of a fuel pump as claimed in claim 1, further comprising an alarm device for alarming the driver an alarm in at least one of:

a case of driving the fuel pump without stopping the fuel pump at a time of the idle stop, a case of reducing a frequency with which the fuel pump is stopped at a time of idle stop, and a case in which a degree of deterioration of the brush is at least equal to a predetermined value.

3. The drive control device of a fuel pump as claimed in claim 1, further comprising a deterioration degree estimation device for estimating a degree of deterioration of the brush according to at least one of a number of times that the fuel pump is started, a rush current at a time of startup, a rush current peak value, and a rush current duration at a time of estimating a degree of deterioration of the brush.

4. The drive control device of a fuel pump as claimed in claim 3, wherein the deterioration degree estimation device estimates a degree of deterioration of the brush according to an integrated value of at least one of a number of times that the fuel pump is started, a rush current at a time of startup, a rush current peak value, and a rush current duration.

5. A drive control device of a fuel pump for sucking fuel in a fuel tank, supplying the fuel to an internal combustion engine, and using a motor provided with a brush as a drive source thereof, comprising:

an idle stop control device that performs an idle stop for stopping the internal combustion engine and the fuel pump when a specified idle stop condition is satisfied while a vehicle is stopped and thereafter starts the fuel pump to automatically start the internal combustion engine when a driver performs a specified operation of starting the vehicle, wherein the idle stop control device at least one of predicts and detects at least one of stress applied to a brush, a degree of deterioration of the brush, a rush current, a rush current peak value, a rush current duration, a state of the internal combustion engine, and a state of the vehicle at a time of starting the fuel pump, and varies a frequency, with which the fuel pump is stopped by the idle stop accordingly.

6. The drive control device of a fuel pump as claimed in claim 5, further comprising an alarm device for alarming the driver an alarm in at least one of:

a case of driving the fuel pump without stopping the fuel pump at a time of the idle stop, a case of reducing a frequency with which the fuel pump is stopped at a time of idle stop, and a case in which a degree of deterioration of the brush is at least equal to a predetermined value.

7. The drive control device of a fuel pump as claimed in claim 5, further comprising a deterioration degree estimation device for estimating a degree of deterioration of the brush according to at least one of a number of times that the fuel pump is started, a rush current at a time of startup, a rush current peak value, and a rush current duration at a time of estimating a degree of deterioration of the brush.

8. The drive control device of a fuel pump as claimed in claim 7, wherein the deterioration degree estimation device estimates a degree of deterioration of the brush according to an integrated value of at least one of a number of times that the fuel pump is started, a rush current at a time of startup, a rush current peak value, and a rush current duration.

9. The drive control device of a fuel pump according to claim 1, wherein the idle stop control device is configured to perform the stop inhibition control even when the specified idle stop condition is satisfied, in case that a predicted or detected value exceeds a predetermined value.

10. The drive control device of a fuel pump according to claim 5, wherein the idle stop control device is configured to reduce the frequency of stopping the fuel pump as a predicted or detected value increases.

11. A drive control device of a fuel pump for sucking fuel in a fuel tank of a vehicle, supplying the fuel to an internal combustion engine, and using a motor provided with a brush as a drive source thereof comprising:

an idle stop control device that performs an idle stop for stopping the internal combustion engine and the fuel pump when a specified idle stop condition is satisfied while the vehicle is stopped and thereafter starts the fuel pump to automatically start the internal combustion engine when a driver performs a specified operation of starting the vehicle, wherein the idle stop control device has a section that predicts or detects at least one of a brush stress applied to the brush and a degree of deterioration of the brush, and wherein the idle stop control device has a section that inhibits stopping the fuel pump and continues to drive the fuel pump without stopping the fuel pump while stopping the engine at a time of satisfaction of the specified idle stop, when a predicted or detected value of the at least one of the brush stress and the degree of deterioration of the brush exceeds a predetermined value.

12. A drive control device of a fuel pump for sucking fuel in a fuel tank, supplying the fuel to an internal combustion engine, and using a motor provided with a brush as a drive source thereof, comprising:

an idle stop control device that performs an idle stop for stopping the internal combustion engine and the fuel pump when a specified idle stop condition is satisfied while a vehicle is stopped and thereafter starts the fuel pump to automatically start the internal combustion engine when a driver performs a specified operation of starting the vehicle, wherein the idle stop control device has a section that predicts or detects at least one of brush stress applied to the brush and a degree of deterioration of the brush, and wherein the idle stop control device has a section that reduces a frequency of stopping the fuel pump relative to a frequency of satisfaction of the specified idle stop, as a predicted or detected value of the at least one of the brush stress and the degree of deterioration of the brush exceeds a predetermined value.

* * * * *